United States Patent
Cervantes

(10) Patent No.: US 8,385,613 B2
(45) Date of Patent: Feb. 26, 2013

(54) BIOMETRIC AUTHENTICATION

(75) Inventor: Miguel Angel Cervantes, Barcelona (ES)

(73) Assignee: Bolison Assets B.V., LLC, Dover, DE (US)

( * ) Notice: Subject to any disclaimer, the term of this patent is extended or adjusted under 35 U.S.C. 154(b) by 74 days.

(21) Appl. No.: 12/688,884

(22) Filed: Jan. 17, 2010

(65) Prior Publication Data

US 2010/0135540 A1   Jun. 3, 2010

Related U.S. Application Data

(63) Continuation of application No. 11/523,481, filed on Sep. 18, 2006, now Pat. No. 7,676,068.

(51) Int. Cl.
*G06K 9/00* (2006.01)

(52) U.S. Cl. .................................. 382/124; 382/115

(58) Field of Classification Search .......... 382/115–118, 382/124–127
See application file for complete search history.

(56) References Cited

U.S. PATENT DOCUMENTS

| | | | | |
|---|---|---|---|---|
| 5,291,560 | A * | 3/1994 | Daugman | 382/117 |
| 5,613,014 | A * | 3/1997 | Eshera et al. | 382/124 |
| 7,676,068 | B2 * | 3/2010 | Cervantes | 382/115 |
| 2004/0017934 | A1 * | 1/2004 | Kocher | 382/125 |
| 2005/0069173 | A1 * | 3/2005 | Morisada et al. | 382/103 |
| 2006/0023921 | A1 * | 2/2006 | Saitoh et al. | 382/115 |
| 2006/0056664 | A1 * | 3/2006 | Iwasaki | 382/115 |

OTHER PUBLICATIONS

Non-final Office Action on U.S. Appl. No. 11/523,481, mailed Oct. 20, 2009.

Notice of Allowance on U.S. Appl. No. 11/523,481, mailed Nov. 23, 2009.

* cited by examiner

*Primary Examiner* — Alex Liew

(57) ABSTRACT

A biometric authentication system, including a database of digital images of biometrics of known people, a camera for capturing a digital image of a biometric of an unknown person, a two-dimensional gradient filter coupled with said database and said camera for deriving a spatial gradient of a digital image, and a match processor coupled with the two-dimensional gradient filter for processing two spatial gradients and determining the extent to which the unknown biometric corresponds with a known biometric. A method and a computer-readable storage medium are also described and claimed.

25 Claims, 10 Drawing Sheets

F(i, j)

B(i, j)

grad F(i, j)

BIOMETRIC AUTHENTICATION

PRIORITY REFERENCE TO RELATED APPLICATIONS

This application is a continuation of U.S. application Ser. No. 11/523,481, entitled BIOMETRIC AUTHENTICATION filed on Sep. 18, 2006 by inventor Miguel Angel Cervantes.

FIELD OF THE INVENTION

The present invention relates to use of biometrics for authenticating people.

BACKGROUND OF THE INVENTION

As the importance of protecting against security breaches and transaction fraud increases, the need for highly secure identification and personal verification systems becomes more and more pressing. Biometric systems are used to recognize a person based on physiological or behavioral characteristics. Such systems analyze features based inter alia on facial photos, fingerprints, palm prints, hand geometry, handwriting, iris scans, retinal scans and vein scans. Biometric analyses are becoming critical components of a wide spectrum of highly secure identification systems.

The quality of a biometric identification system depends on many factors, such as system reliability, speed of performance, system ease of use, and system acceptance by people. Acceptance is a function of trust. Thus, many people are wary of iris scans and retinal scans, since they require positioning an open eye in front of a camera.

SUMMARY OF THE DESCRIPTION

The present invention concerns a biometric authentication system which is reliable, fast, easy to use and user trusted. The present invention determines whether or not two images of a textured surface match one another. The textured surface may be a human biometric, the texture of a sheet of paper or a grain of wood, or any other such objects.

There is thus provided in accordance with an embodiment of the present invention a biometric authentication system, including a database of digital images of biometrics of known people, a camera for capturing a digital image of a biometric of an unknown person, a two-dimensional gradient filter coupled with said database and said camera for deriving a spatial gradient of a digital image, and a match processor coupled with the two-dimensional gradient filter for processing two spatial gradients and determining the extent to which the unknown biometric corresponds with a known biometric.

There is further provided in accordance with an embodiment of the present invention a method for biometric authentication, including capturing a digital image, denoted by image F, of a biometric of an unknown person, retrieving a digital image of a biometric of a known person, denoted by image G, from a database of such images, deriving a two-dimensional spatial gradient, denoted by grad F, of biometric image F, and a two-dimensional spatial gradient, denoted by grad G, of biometric image G, for each pixel block $B_k$ from a plurality of pixel blocks $B_1, B_2, \ldots, B_n$, searching for a pixel block $C_k$ such that values of grad F over block $B_k$ substantially correspond with the values of grad G over block $C_k$, determining how many pairs of distinct pixel blocks $B_k$ and $B_m$ satisfy a criterion that the relative displacement between $B_k$ and $B_m$ nearly equals the relative displacement between pixel blocks $C_k$ and $C_m$; and concluding whether or not the unknown biometric matches the known biometric, based on the determining.

There is yet further provided in accordance with an embodiment of the present invention a computer-readable storage medium storing program code for causing a computing device to capture a digital image, denoted by image F, of a biometric of an unknown person, to retrieve a digital image of a biometric of a known person, denoted by image G, from a database of such images, to derive a two-dimensional spatial gradient, denoted by grad F, of palm image F, and a two-dimensional spatial gradient, denoted by grad G, of palm image G, for each pixel block $B_k$ from a plurality of pixel blocks $B_1, B_2, \ldots, B_n$, to search for a pixel block $C_k$ such that values of grad F over block $B_k$ substantially correspond with the values of grad G over block $C_k$, to determine how many pairs of distinct pixel blocks $B_k$ and $B_m$ satisfy a criterion that the relative displacement between $B_k$ and $B_m$ nearly equals the relative displacement between pixel blocks $C_k$ and $C_m$, and to conclude whether or not the unknown biometric matches the known biometric, based on the number of pairs of distinct pixel blocks that satisfy the criterion.

There is further provided in accordance with an embodiment of the present invention a biometric authentication system, including a database of digital images of biometrics of known people, a camera for capturing a digital image of a biometric of an unknown person, a match processor for identifying a second planar graph of nodes within an image of a known biometric that corresponds to a first planar graph of nodes within the image of the known biometric, and a match detector coupled with said match processor for concluding whether or not the unknown biometric matches the known biometric, based on the extent to which edges in the second planar graph align with edges in the first planar graph.

There is yet further provided in accordance with an embodiment of the present invention a method for biometric authentication, including capturing a digital image of a biometric of an unknown person, identifying a second planar graph of nodes within an image of a biometric of a known person that corresponds to a first planar graph of nodes within the image of the unknown biometric, and concluding whether or not the unknown biometric matches the known biometric, based on the extent to which edges in the second planar graph align with edges in the first planar graph.

There is further provided in accordance with an embodiment of the present invention a computer-readable storage medium storing program code for causing a computing device to capture a digital image of a biometric of an unknown person, to identify a second planar graph of nodes within an image of a biometric of a known person that corresponds to a first planar graph of nodes within the image of the unknown biometric, and to conclude whether or not the unknown biometric matches the known biometric, based on the extent to which edges in the second planar graph align with edges in the first planar graph.

BRIEF DESCRIPTION OF THE DRAWINGS

The present invention will be more fully understood and appreciated from the following detailed description, taken in conjunction with the drawings in which.

DETAILED DESCRIPTION

Figure 1A:
FIGS. 1A-1D show four sample digitized palm prints, for analysis in accordance with an embodiment of the present invention.

The present invention concerns an apparatus and method for authenticating a person based one or more biometrics of the person. The present invention has broad applicability to a wide variety of biometrics. For the purposes of clarify and specificity, the description below relates to a palm print, but it will be appreciated by those skilled in the art that the present invention applies equally as well to other biometrics that can be captured within digital images.

The skin in a palm, its valleys, ridges, pores, and the lifelines, form a pattern that is unique to every human being. The present invention analyzes skin characteristics of a person's palm to identify whether the person's palm matches a known palm from a database of images of known palms. Authentication is achieved by (i) capturing an image of the person's palm, (ii) extracting relevant characteristics from the palm image, (iii) comparing the extracted characteristics to information in the database, and (iv) deciding whether or not to authenticate the person. In general, reliability of authentication is measured by two error metrics; namely, a false rejection rate (FRR), which is the probability that an authorized user is rejected, and a false acceptance rate (FAR), which is the probability that an unauthorized used is accepted.

The present invention attains FAR and FRR rates that are comparable to the rates attained by highly reliable conventional biometric systems, such as iris and retina-based systems. The present invention is easy to use; a person merely has to place his hand in front of a camera. In distinction, iris and retina based systems require substantial cooperation on the part of the person, since it is complicated to position the eye in front of a camera, and since people tend to shy away from this. The present invention can be implemented in a low cost system using simple widely-available cameras.

Use of palm skin characteristics for biometric authentication has many advantages. One advantage is that dermal texture is stable over time, and as such a palm-based system is reliable over a long term.

Another advantage is that palm skin characteristics are unique to every individual, and as such a palm-based system is very unlikely to confuse two individuals.

Yet another advantage is that palm prints can be extracted from standard photos of reasonable quality, and as such a palm-based system can use low cost hardware.

Another advantage is easy user registration, since a user can be registered by taking a picture of the palm of his hand. Moreover, positioning a palm in front of a camera is fast and easy. As such, a palm-based system can quickly and conveniently register new users.

Yet another advantage is that a palm-based system does not require physical contact between a device and a person's palm. A user may freely position his hand in front of a camera, or rest his hand on a support. In distinction, fingerprint recognition devices require physical contact of a finger with a device, and there is the possibility that the fingerprint of a previous user has a residue on the device, which in turn results in higher FRR and FAR rates. As such, a palm-based system has hygienic safety and higher reliability.

Another advantage of a palm-based system is that the camera may be hidden or subtly blended into the system environment.

Before describing implementation of the present invention, as illustrated in FIGS. 4-8 hereinbelow, it is helpful to first visualize the invention through a sample user interface. It may be appreciated by those skilled in the art that there are many different user interfaces that can be applied to the present invention, and that the user interface presented in FIGS. 2, 3A and 3B is but one such interface that provides appropriate graphics for simple user input and appropriate visualization for easy comprehension of results.

User Interface

Figure 1B:
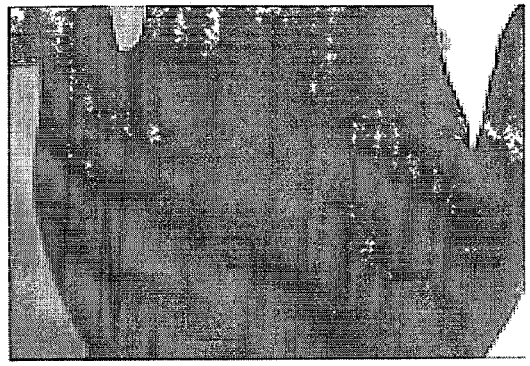
Figure 1C:
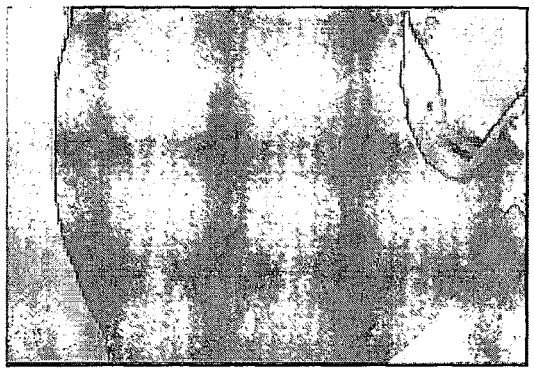
Figure 1D:
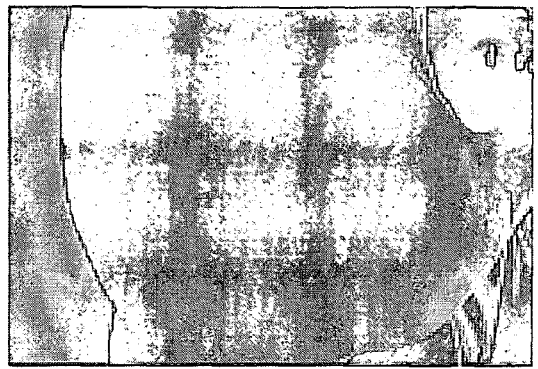

Reference is now made to FIGS. 1A-1D, which show four sample digitized palm prints. Although nothing is known about the four palms a priori, the present invention can be used to analyze the digitized palm prints and to automatically infer that the palms in FIGS. 1A-1C are all distinct, and that the palm in FIG. 1D is the same palm as in FIG. 1C.

Figure 2:
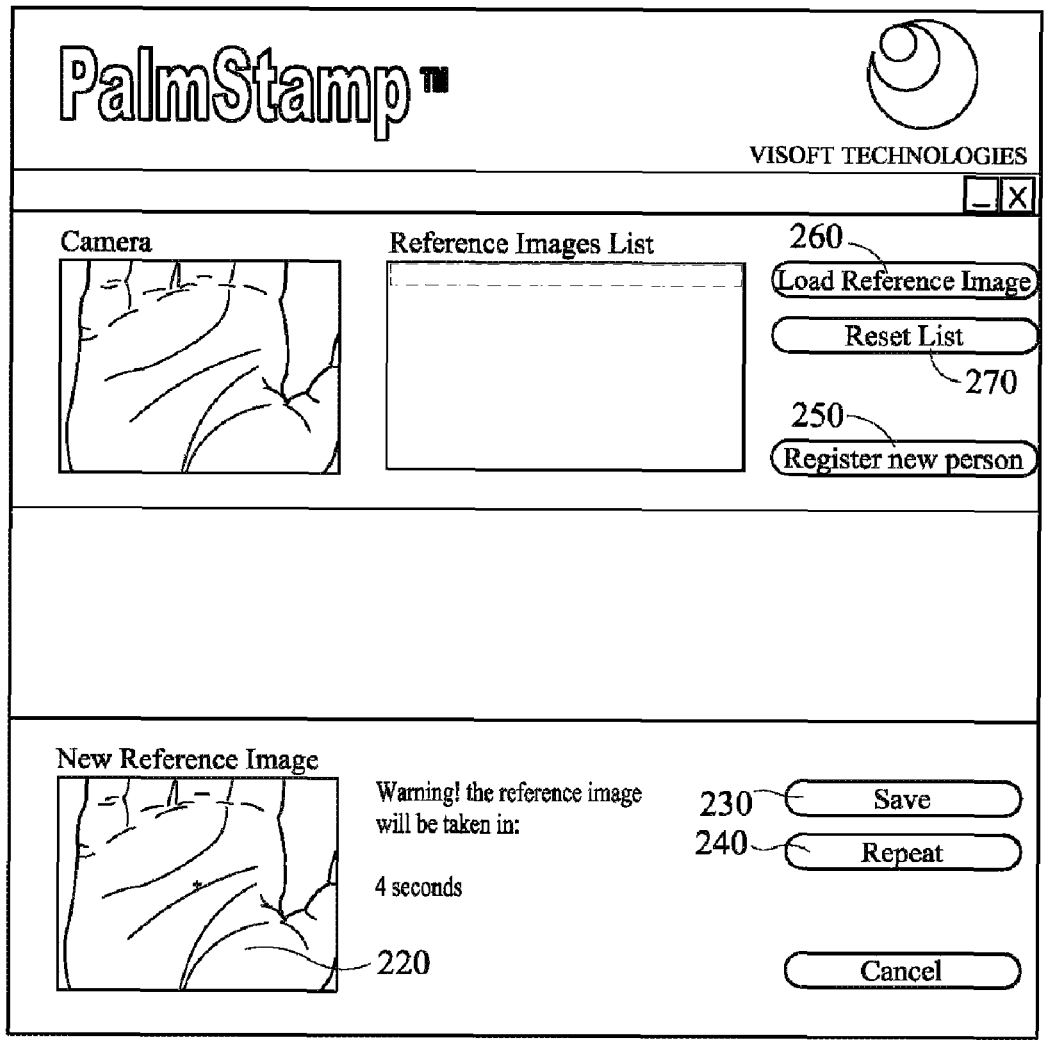
FIG. 2 is an illustration of a user interface for registering a new palm print, in accordance with an embodiment of the present invention.
Figure 3A:
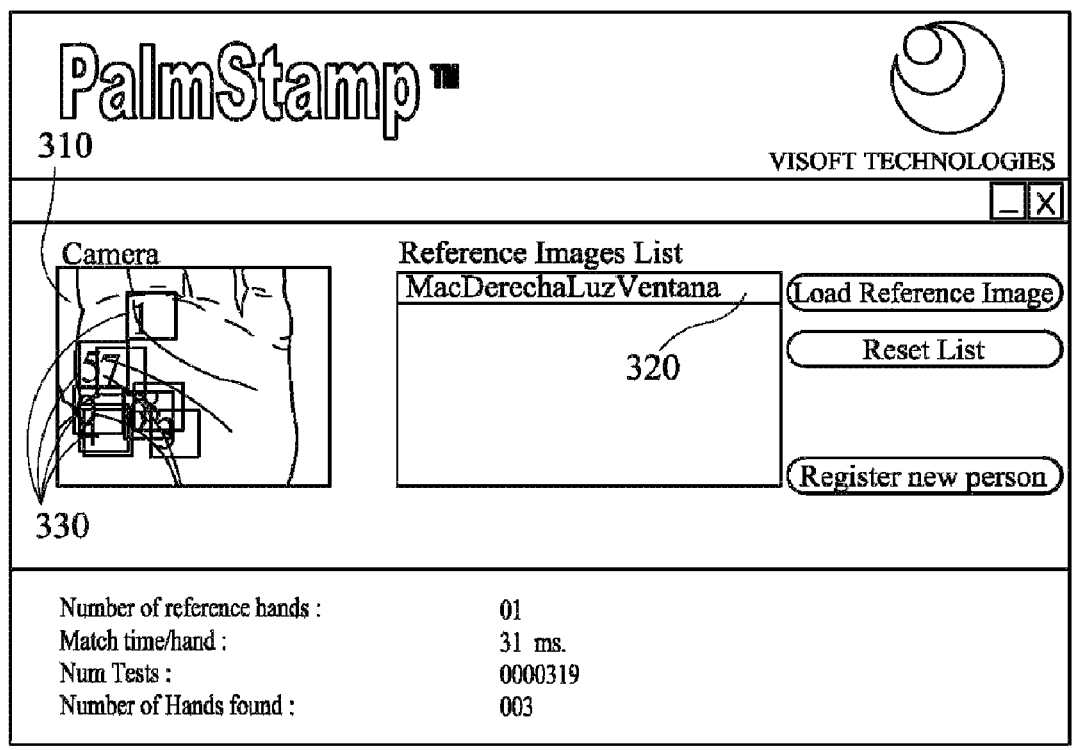
FIGS. 3A and 3B are illustrations of a user interface for determining whether or not a palm in the camera's field of view matches one of the palms in the database of reference images, in accordance with an embodiment of the present invention.
Figure 3B:
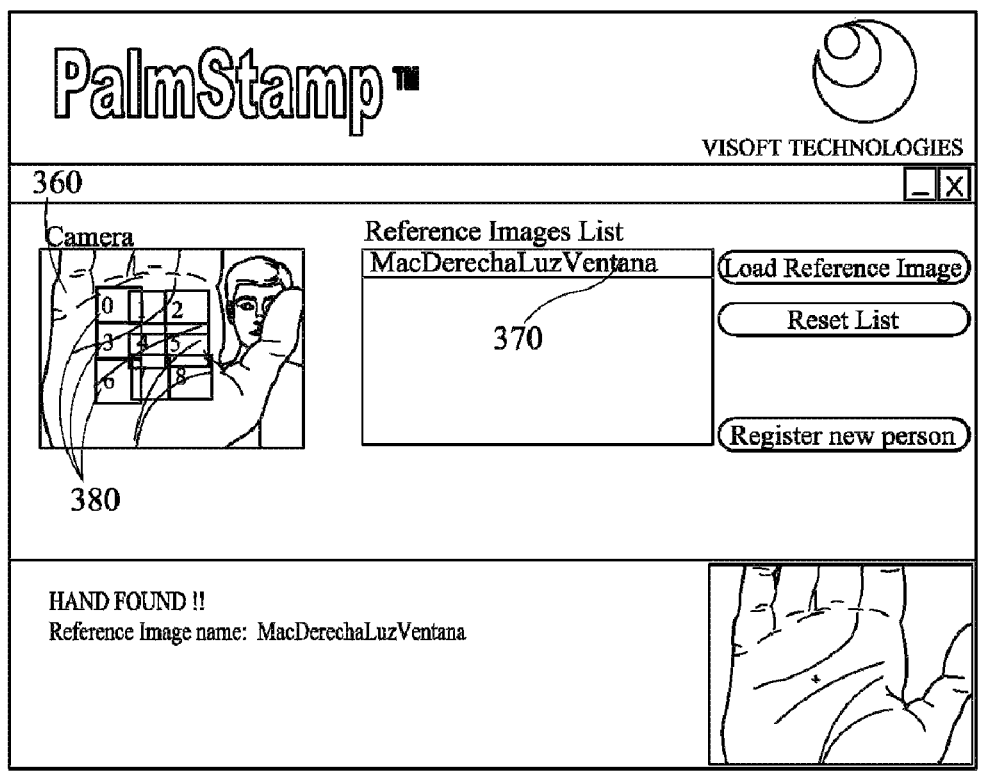

Reference is now made to FIG. 2, which is an illustration of a user interface for registering a new palm print, in accordance with an embodiment of the present invention. Registration is invoked by clicking on a "Register new person" button 210. A person positions his palm in front of a camera (element 410 of FIG. 4 hereinbelow), and the camera's field of view is displayed as image 220. After capturing a photo of the palm, the person or an operator can press on a "Save" button 230 to save the photo, or on a "Repeat" button 240 to capture another photo of the person's palm. When "Save" button 230 is pressed image 220 is saved into a database of reference images of registered people (element 420 of FIG. 4 hereinbelow).

A "Load Reference Image" button 260 is used to load images from the database of reference images, and a "Reset List" button 270 is used to reset the list of reference images.

It is noted that image 220 corresponds to the image in FIG. 1C.

Reference is now made to FIGS. 3A and 3B, which are illustrations of a user interface for determining whether or not a palm in the camera's field of view matches one of the palms in the database of reference images, in accordance with an embodiment of the present invention. As shown in FIG. 3A, a person's palm is positioned in front of the camera, and the camera's field of view is displayed as image 310.

Image 310 is analyzed for comparison with a list 320 of reference images from the database of registered palms. Specifically, in FIG. 3A, the list of reference images comprises image 220 of FIG. 2, which is labeled "MacDerechaLuzVentana". Using match algorithms described hereinbelow, the present invention infers that that image 310 does not match reference image 220. The computational time for the analysis is indicated as 31 msec.

Shown in image 310 are nine blocks 330 labeled 0, 1, ..., 8. As described below with reference to match processor 440 of FIG. 4, these blocks are used to compare image 310 with image 220, and to derive a statistical level of confidence for inferring whether or not the images match. These blocks are denoted by $B_1, B_2, B_n$ in EQUATION 2 hereinbelow.

Similarly, in FIG. 3B a palm image 360 from a camera's field of view is analyzed for comparison with a list 370 of registered images. Image 360 corresponds to the image in FIG. 1D. This time the present invention infers that image 360 does indeed match reference image 220. The inference is based on analysis of the nine blocks 380 labeled 0, 1, ..., 8, as in FIG. 3A.

Figure 4:
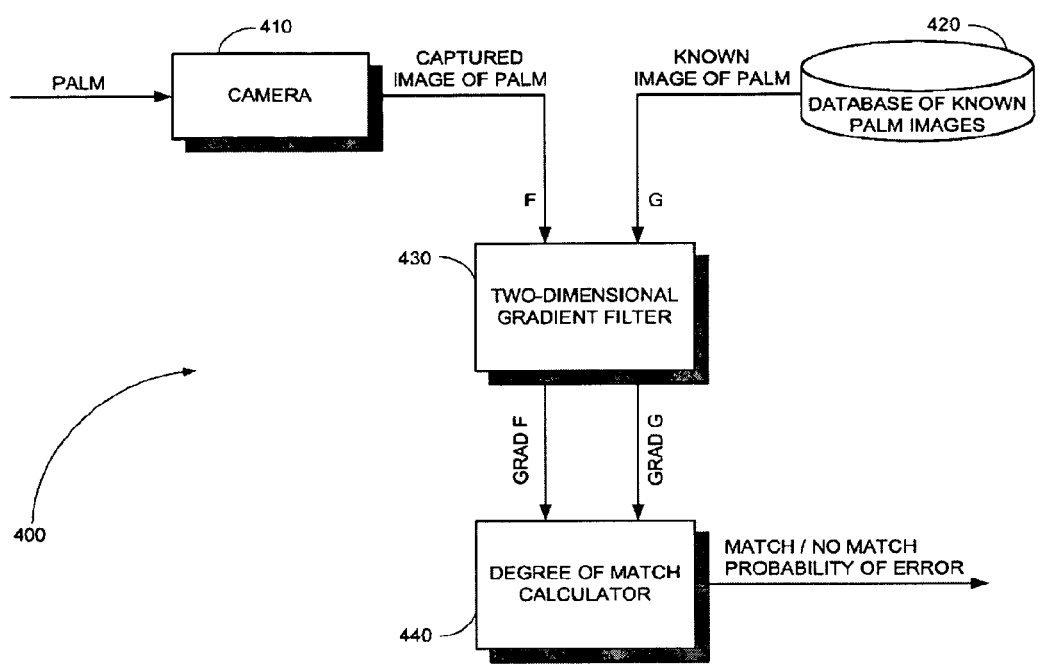
FIG. 4 is a simplified block diagram of a palm authentication system, in accordance with an embodiment of the present invention.

Reference is now made to FIG. 4, which is a simplified block diagram of a palm authentication system 400, in accordance with an embodiment of the present invention. As shown in FIG. 4, a camera 410 captures an image of a palm that is positioned in the camera's field of view. System 400 compares the captured image of the palm, denoted F, with one of several known images of palms from a database 420 of such images, denoted G, to determine if the captured palm image F matches one of the known palm images G. Determination of a match can be used favorably, to grant access, or unfavorably, to deny access, depending on the nature of the implementation of system 400.

The captured image of the palm, F, and the database image, G, are each processed by a two-dimensional gradient filter 430, to extract gradient images therefrom, denoted grad F and grad G, respectively. Gradient filter 430 accepts as input an image, F, and produces as output a gradient, grad F. Operation of gradient filter 430 is described in detail hereinbelow.

The gradients grad F and grad G are then processed by a degree of match calculator 440, to determine one or more statistics that relates to how well the two gradients match. Degree of match calculator 440 accepts as input two gradients, grad F and grad G, and produces as output one or more statistics that are used to decide whether or not palm images F and G match, and a probability of error in concluding that the images match. The probability of error is a probability that the statistics produced by match calculator would have been produced if the images F and G do not match. Operation of degree of match calculator 440 is described in detail hereinbelow.

In the ensuing description, an image of a palm is represented as a rectangular array of intensity pixel values $F(i, j)$, $0 \leq i < H$, $0 \leq j < V$, where H and V are horizontal and vertical dimensions, respectively. Thus, for example, for systems that scan palms at a 136×96 pixel resolution, H=136 and V=96.

Operation of Filter 430

In accordance with an embodiment of the present invention, the image, F, is filtered to produce a gradient as follows:

$$gradF(i, j) = (\nabla_H F(i, j), \nabla_V F(i, j)), \quad (1A)$$

where $$\nabla_H F(i, j) = \frac{1}{\sigma} \sum_{k=i+1}^{i+\sigma} [F(k, j) - F(k-\sigma, j)], \quad (1B)$$

and $$\nabla_V F(i, j) = \frac{1}{\sigma} \sum_{k=j+1}^{j+\sigma} [F(i, k) - F(i, k-\sigma)]. \quad (1C)$$

It is noted that grad $F(i, j)$ is a two-dimensional vector, and that its components are averaged spatial derivatives in a horizontal and in a vertical direction, averaged over a window of length $\sigma$.

Use of a spatial derivative serves to eliminate effects of changes in brightness and darkness in the palm image F, use of two directional derivatives serves to eliminate effects of direction of light in the palm image F, and use of averages serves to reduce sensitivity to noise introduced by camera 410. As such, grad $F(i, j)$ is effective in eliminating effects of the surrounding and effects of noise in palm image F, and provides a good characteristic for image F.

It may be appreciated by those skilled in the art that EQUATIONS 1A-1C are but one sample embodiment of filter 430, and that other types of filters are also compatible with system 400. Another filter useful with the present invention is defined by $$gradF(i, j) = F(i, j) - \frac{1}{(r+1)^2} \sum_{k=i-\frac{r}{2}}^{i+\frac{r}{2}} \sum_{m=j-\frac{r}{2}}^{j+\frac{r}{2}} P(k, m). \quad (2)$$

Here grad F is a scalar, and not a two-dimensional vector as above, that measure the difference between the value of $F(i, j)$ and the average of F in a neighborhood of size r around pixel location $(i, j)$.

Yet another filter useful with the present invention is obtained by applying binary thresholding to F, based on the global average of F. Specifically, for 8-bit color values, a binary image B is defined by $$B(i, j) = \begin{cases} 255, & F(i, j) \geq avg \\ 0, & F(i, j) < avg \end{cases} \quad (3A)$$

where avg is the average of all color values of F, $$avg = \frac{1}{HV} \sum_{i=0}^{H-1} \sum_{j=0}^{V-1} F(i, j). \quad (3B)$$

The filtered image grad F is then obtained by applying a blur filter to the binary image B. The rationale for the blurring is to ensure that grad F is a smooth function of $(i, j)$. Here, too, grad F is scalar-valued, and not a two-dimensional vector.

Figure 5A:
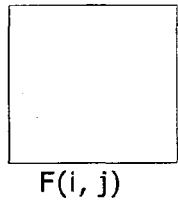
FIGS. 5A-5C illustrate operation of the system of FIG. 4 on an image of a blank piece of paper, in accordance with an embodiment of the present invention.
Figure 5B:
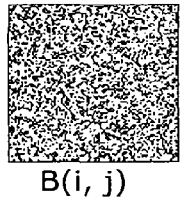
Figure 5C:
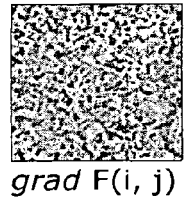

This latter filter is particularly suited for matching patterns such as grains of blank sheets of paper or grains of wood. Reference is now made to FIGS. 5A-5C, which illustrate operation of filter 430 on an image of a blank piece of paper. Shown in FIG. 5A is a sample grain pattern taken from a blank piece of paper, represented as a digital image $F(i, j)$, which is the input image to filter 430. The grain pattern includes subtle variations of white. A histogram analysis of the image in FIG. 5A indicates that the mean luminance value is 251.73. In this regard, it is noted that a luminance value of 255 is pure white.

Shown in FIG. 5B is a binary image $B(i, j)$ with value of 1 or 0 corresponding to whether or not the value of $F(i, j)$ is greater than or less than 251.73, respectively. Shown in FIG. 5C is the output image, grad $F(i, j)$, produced by filter 430 by applying a blur filter to binary image $B(i, j)$. The blur filter serves to produce a smooth function of pixel location $(i, j)$.

Smoothness of grad F is advantageous for efficient operation of match processor 440, as described with respect to EQUATION 7 hereinbelow.

For the sake a clarity the ensuing description assumes that filter 430 applies the two-dimensional spatial gradient described by EQUATIONS 1A-1C hereinabove. However, it will be appreciated by those skilled in the art that other suitable filters may be used instead, including inter alia the filter described by EQUATION 2 or the filter described by EQUATIONS 3A and 3B.

Operation of Match Processor 440

In accordance with an embodiment of the present invention, two images, F and G, are compared by determining a degree of match between their respective gradients, grad F(i, j) and grad G(i, j). The degree of match is evaluated based on a set of n pixel blocks $B_1, B_2, \ldots, B_n$, each block being a rectangular array of dimensions S×T of the form $$B_k = \{(i,j): i_k \leq i < i_k + S, j_k \leq j < j_k + T\}, k = 1, 2, \ldots, n. \quad (4)$$

The coordinates $i_k$ and $j_k$ determine the position of block $B_k$. It is assumed that $i_k < H - S$ and that $j_k < V - T$, so that block $B_k$ doesn't extend beyond the limits of grad F.

In general, for two arbitrary rectangular arrays, B and C, of pixels of dimensions S×T, positioned at (bx, by) and (cx, cy), respectively, define a measure of discrepancy as follows:

$$\varepsilon(B, C) = \sum_{i=0}^{S-1} \sum_{j=0}^{T-1} \|gradF(bx+i, by+j) - gradG(cx+i, cy+j)\|^2, \quad (5)$$

where the norm of a two-dimensional vector $d = (d_H, d_V)$ is given by $\|d\|^2 = d_H^2 + d_V^2$. Moreover, define the relative displacement of blocks B and C by $$\delta(B, C) = (bx - cx, by - cy). \quad (6)$$

That is, $\delta(B, C)$ is the two-dimensional displacement vector that is needed to shift block B to the position of block C.

For each block, $B_k$, determine a corresponding block $C_k$, among all pixel blocks of dimensions S×T, such that $\varepsilon(B_k, C)$ is minimized; i.e., $$\varepsilon(B_k, C_k) = \min\{\varepsilon(B_k, C): \text{all pixel blocks C of dimension } S \times T\}. \quad (7)$$

It may be appreciated by those skilled in the art that $C_k$ may be considered to be the block from grad G that best matches the block $B_k$ from grad F.

It may also be appreciated by those skilled in the art that the search indicated by EQUATION 7 may be restricted to a subset of all pixel blocks C. For example, the search may be restricted to pixel blocks C that are positioned within a local neighborhood of pixel block $B_k$, or within a "test area" of the image, the test area being a portion of the image with important pattern information. In one embodiment of the present invention, the test area is a 68×68 blocks of pixels in the central part of the palm images, for images of resolution 136×96. Ideally, the test area should include only information about the pattern being matched, and not other information such as background of the image.

Similarly, the search may be restricted to pixel blocks C that are positioned at special locations (cx, cy), such as locations for which cx is divisible by a spacing parameter dx>1 and for which cy is divisible by a spacing parameter dy>1. Such blocks C are uniformly positioned at horizontal locations dx, 2*dx, 3*dx, ..., and at vertical locations dy, 2*dy, 3*dy, .... For example, since the filters grad F and grad G are generally smooth functions of (i, j), due to the averaging in EQUATIONS 1B and 1C, values of grad F and grad G do not change substantially from one pixel location to the next, and it generally suffices go confine the search in EQUATION 7 to blocks positioned at one of the four locations with each 2×2 area, such as cx=0, 2, 4, 6, ... and cy=0, 2, 4, 6, .... This serves to speed up the computational time required to carry out EQUATION 7 for each pixel block $B_k$ by reducing the number of blocks C that have to be searched by a factor of four.

It may also be appreciated by those skilled in the art that an alternative to finding the block $C_k$ that attains the minimum in EQUATION 7, is to find a block $C_k$ for which $\varepsilon(B_k, C_k)$ is less than a prescribed bound. This also serves to speed up the computational time required to carry out EQUATION 7.

Figure 6:
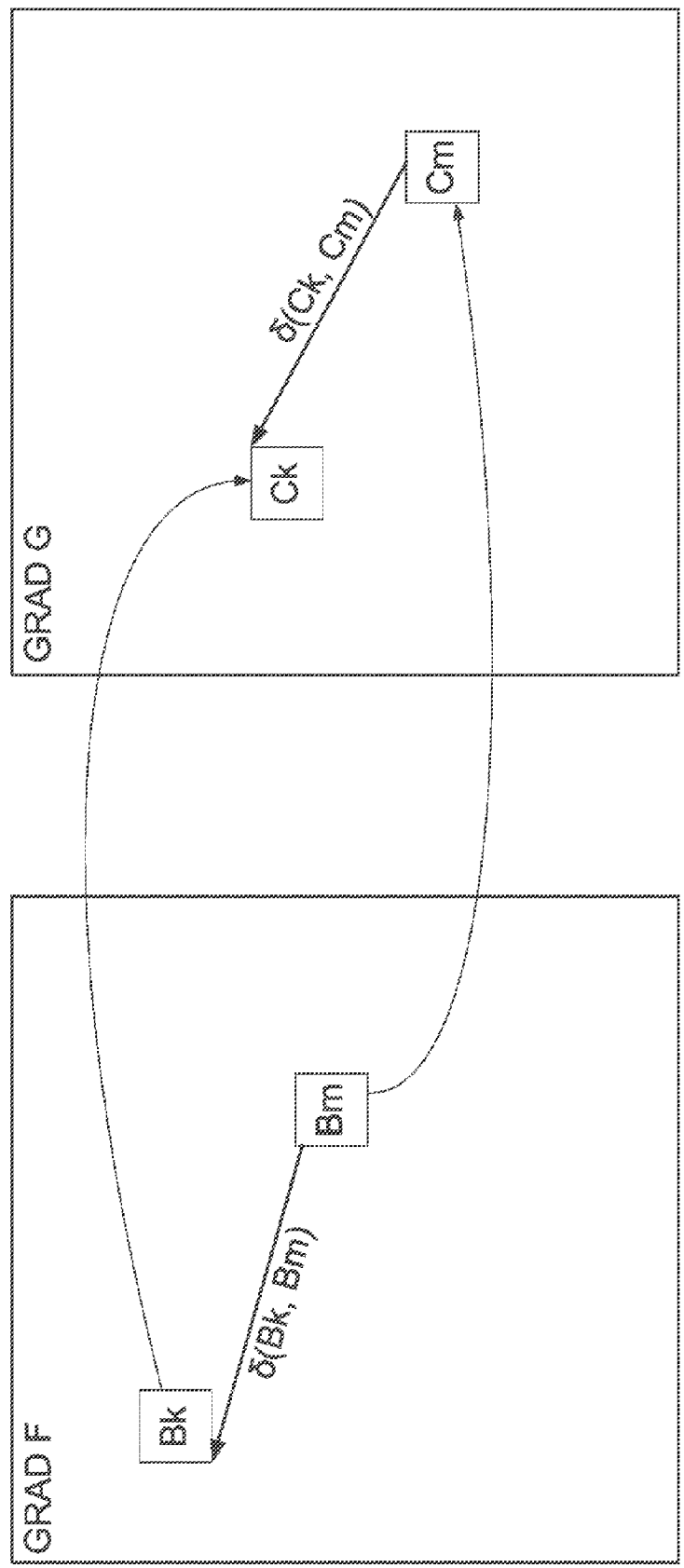
FIG. 6 is an illustration of the difference of two block displacement vectors, derived from two palm prints, in accordance with an embodiment of the present invention.
Figure 7:
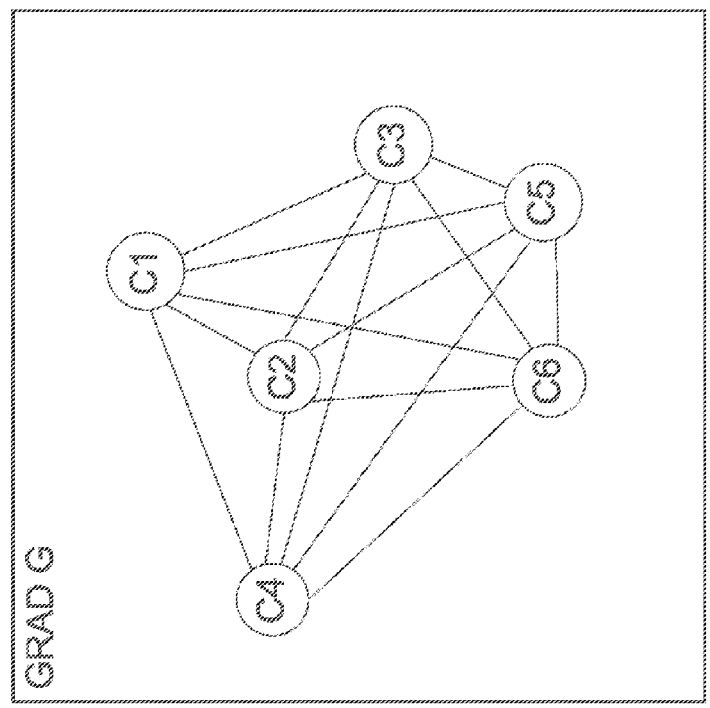
FIG. 7 is an illustration of planar graphs of nodes and edges, derived from two palm prints, that correspond with one another, in accordance with an embodiment of the present invention.
Figure 7:
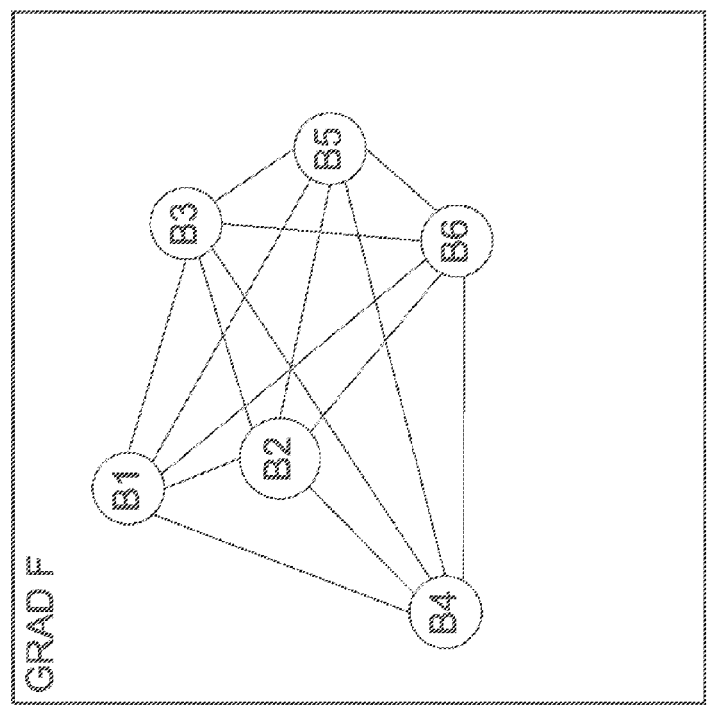

For each of the ½ n(n−1) distinct pairs of indices k and m, $0 \leq k < n$, $0 \leq m < n$, consider the differences $$\text{diff}(k, m) = \|\delta(B_k, B_m) - \delta(C_k, C_m)\|, \quad (8)$$

where $\delta(B_k, B_m)$ and $\delta(C_k, C_m)$ are defined by EQUATION 6 hereinabove. Referring to FIG. 6, it is noted that $\delta(B_k, B_m) - \delta(C_k, C_m)$ represents the two-dimensional relative difference of the displacement vector between $B_k$ and $B_m$ and the displacement vector between $C_k$ and $C_m$.

If images F and G correspond to one another in an isometric way, then it is expected that the differences diff(k, m) be small. Otherwise, there is no reason to expect this to happen. Indeed, referring to FIG. 7, the positions of the blocks $B_k$ can be considered as a first planar graph of nodes within grad F, and the positions of the blocks $C_k$ can be considered as a second planar graph of the corresponding nodes within grad G. If image F and G are isomerically equivalent, i.e., if image G is a rigid transformation of image F, then the lengths of the edges in the first planar graph will equal the lengths of the corresponding edges in the second planar graph. The differences diff(k, m) measure the deviations between corresponding edges. For example, diff(1, 2) measures the deviation between the edge connecting node B2 to B1 and the edge connecting node C2 to C1.

As such, the number of pairs of distinct indices k and m for which diff(k, m)<τ, for a prescribed threshold, τ, is an indicator of the extent to which the images F and G match. This extent can be quantified by noting that the approximate probability, $P_{error}$, that image F and G are not the same palm, given that at least $L^2$ of the differences diff(k, m) are less than τ, is $$P_{error} < \binom{n}{L} p^L, \quad (9A)$$

where $$p = \tau^2 / R \quad (9B)$$

and where R is the total number of blocks over which the minimum in EQUATION 7 is searched.

Depending on the nature of the application, $P_{error}$ is either the FRR or the FAR. I.e., if a match between F and G is used to authenticate a person, then $P_{error}$ is the probability of authenticating an unauthorized person; namely, the FAR. If a match between F and G is used to reject a person, then $P_{error}$ is the probability of rejecting an authorized person; namely, the FRR.

The estimate in EQUATIONS 9A and 9B is based on the assumption that if the images F and G are not the same palm, then the block $C_k$ that corresponds to the block $B_k$ is uniformly distributed over the blocks searched in EQUATION 7. In turn, for each fixed k, the number of blocks $C_m$ that satisfy diff(k, m)<τ is a random variable distributed according to a binomial distribution with probability of success p.

For example, for the parameter values given in TABLE I, the probability of an error, $P_{error}$, in concluding that the palms in images F and G match, is less than $$\binom{7}{5}\left[\frac{4^2}{(160-16)(160-16)}\right]^5 = 5.7 \times 10^{-15}.$$

TABLE I

Example parameter values for matching determination

| Parameter | Value | Description |
|---|---|---|
| H | 160 | Horizontal pixel dimension of palm images |
| V | 160 | Vertical dimension of palm images |
| S | 16 | Horizontal dimension of pixel blocks $B_k$ |
| T | 16 | Vertical dimension of pixel blocks $B_k$ |
| n | 7 | Total number of pixel blocks $B_k$ |
| τ | 4 | Threshold value for differences from EQUATION 8 |
| L | 5 | $L^2$ is the number of differences from EQUATION 8 that are below τ |

Figure 8:
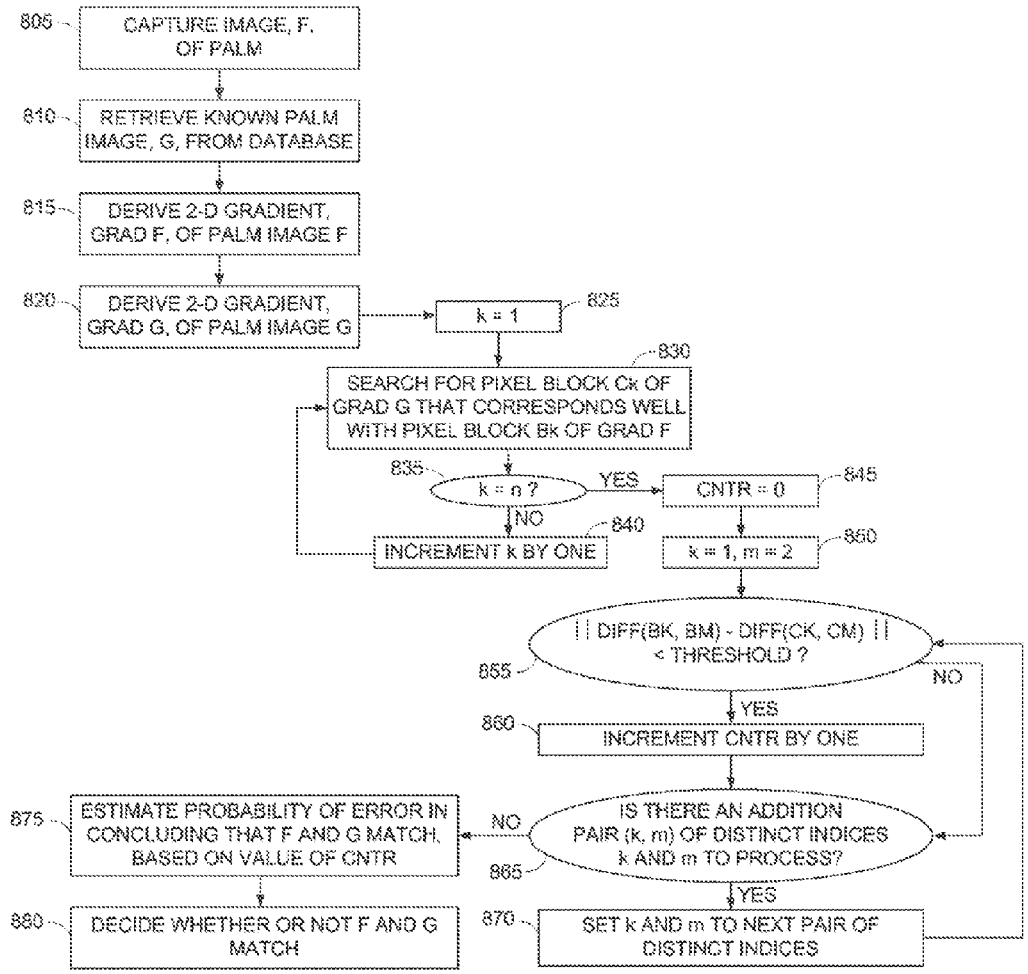
FIG. 8 is a simplified flowchart of a method of palm authentication, in accordance with an embodiment of the present invention.

Reference is now made to FIG. 8, which is a simplified flowchart of a method of palm authentication, in accordance with an embodiment of the present invention. At step 805, an image of the palm of a hand, denoted by F, is captured. At step 810, a known image of a palm, denoted by G, is retrieved from a database of images, for the purpose of comparing with image F. At step 815 a two-dimensional spatial gradient of image F, denoted by grad F, is calculated according to EQUATIONS 1A-1C. Similarly, at step 820 a two-dimensional spatial gradient of image G, denoted by grad G, is calculated.

At steps 825-840 pixel blocks $C_k$ are determined so that the values of grad G over block $C_k$ corresponds with the values of grad F over pixel block $B_k$. It is assumed that a plurality of pixel blocks $B_1, B_2, \ldots, B_n$ of the form of EQUATION 4 have been pre-determined. Specifically, at step 825 a running counter, k, is initialized to k=1. At step 830 a search is made over a plurality of blocks C, to find a block $C_k$ that corresponds well with $B_k$, according to EQUATIONS 5 and 7. As mentioned hereinabove, the search at step 830 may be a search over all blocks C, or over a subset of blocks C such as those blocks C that are positioned within a local neighborhood of block $B_k$, or those blocks C that are positioned at prescribed locations. At step 835 a determination is made if all n blocks $B_k$ have been processed. If not, then at step 840 the counter k is incremented by one. If so, then processing proceeds to step 845.

At steps 845-870 a determination is made as to how many pairs of distinct blocks $C_k$ and $C_m$ satisfy the criterion of EQUATION 8. Specifically, at step 845 a running counter, CNTR, is initialized to zero. At step 850 running indices k and m are initialized to k=1 and m=2. The indices k and m run over all distinct pairs of indices k=1, 2, ..., n and m=1, 2, ..., n. There are ½n(n−1) such pairs. At step 855 a determination is made as to whether or not diff(k, m)<τ, for a prescribed threshold, τ. If so, then at step 860 CNTR is incremented by one and processing proceeds to step 865. Otherwise, processing proceeds directly from step 855 to step 865, without incrementing CNTR. At step 865 a determination is made whether or not all of the ½n(n−1) pairs of distinct indices k and m have been considered. If not, then at step 870 k and m are set to values that have not yet been considered and processing returns to step 855. If all pairs of distinct indices k and m have been considered, then processing proceeds to step 875.

At step 875 the probability of an error, $P_{error}$, in concluding that image F and G match, is estimated. Based on this estimate, a decision is made at step 880 whether or not $P_{error}$ is negligible enough to comfortably conclude that F and G match.

In an alternative embodiment, instead of basing the decision at step 865 on whether or not all pairs of distinct indices k and m have been considered, the decision may be based on whether or not CNTR exceeds a predetermined bound. For example, if CNTR exceeds 20, then this may suffice to conclude that the palms from images F and G match, without running through all pairs of distinct indices k and m. In turn, this speeds up the computation time required for the match process.

In yet an alternative embodiment, the decision at step 865 can be based on the number of blocks $B_k$ for which all edges originating at $B_k$ correspond with all edges originating at $C_k$. For example, with reference to FIG. 7, which illustrates six pixel blocks $B_1, B_2, B_3, B_4, B_5, B_6$ of grad F corresponding respectively to pixel blocks $C_1, C_2, C_3, C_4, C_5, C_6$ of grad G, the decision at step 865 can be based on whether or not there exist at least four distinct indices k such that diff($B_k, C_m$)<τ, for all values of m. For this embodiment, the match process can be accelerated by observing that if diff($B_k, C_m$)≧τ for three distinct indices k and any indices m, then necessarily the decision at step 865 is negative, and it is not necessary to calculation diff($B_k, C_m$) for further indices k and m, and the loop comprising steps 845-870 in FIG. 8 may be terminated early. In turn, this speeds up the computational time required for the match process.

It may be appreciated by those skilled in the art that for some embodiments of the present invention, it is advantageous to normalize the reference images from the database of images so that they all have the same rotation and scale. In particular, people's palms may not all be positioned at the same orientation and at the same distance from a camera. Normalization helps to ensure that the matching process as described hereinabove by EQUATION 7 searches for blocks C that are the same orientation and scale as block $B_k$. Normalization may be achieved by preparing a standard image with a palm positioned vertically and at a known distance from a camera. Then, as each reference image is acquired, as indicated in FIG. 2, the optimal angle of rotation and horizontal and vertical scale factors (i.e., the optimal affine transformation) can be found that best align the reference image with the standard image.

In reading the above description, persons skilled in the art will realize that there are many apparent variations that can be applied to the methods and systems described. Thus, as mentioned hereinabove, it will be appreciated that the present invention is applicable to a wide spectrum of biometrics in addition to palm prints, including inter alia faces, fingerprints, handwriting, iris scans, retinal scans and vein scans.

More generally, it will be appreciated that the present invention is applicable to determining whether two images match, for images that contain textures such as skin textures. In addition to skin textures, the present invention is also advantageous in matching non-skin textures, such as textures of sheets of paper and textures of grains of woods.

The present invention is also applicable to authentication of printed documents, to protect against forgery. Specifically, an original physical document on one or more pages of paper is scanned, and a blank portion in a margin of the paper is stored in the digital file that stores the scan. Subsequently, match processor 440 (FIG. 4) can compare an unknown document with the digital file to see if the texture of the paper of the unknown document matches the blank portion of the original physical document.

The present invention is also applicable to automatically identifying products in a supermarket or other such retail store at a checkout counter, by scanning a product label and comparing with a database of reference digital product labels.

The present invention is also applicable to recognition of satellite and other remote sensing data, by matching remote sensor data with data in a geographical information system (GIS), or with a map that is referenced spatially using a coordinate system. Match processor 440 can compare a portion of sensor data of unknown location or of unknown original with a complete digital map that is spatially referenced, in order to determine the location of the unknown data. Such data could be a photograph, a satellite image or other remote sensor data. This is advantageous in determining the geographic location corresponding to a photograph, or in aligning unreferenced image data within a spatial system.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A biometric authentication system, comprising:
a database of digital images of biometrics of known people;
a camera configured to capture a digital image of a biometric of an unknown person;
a two-dimensional gradient filter coupled to the database and the camera and configured to derive a first spatial gradient of the captured digital image; and
a match processor coupled to the two-dimensional gradient filter and configured to:
identify a plurality of pairs of blocks of pixels, wherein each pair of blocks includes a first block from the first spatial gradient of the captured digital image and a second block from a second spatial gradient of a digital image from the database, wherein the second block is identified from within a specific area of the digital image from the database, and wherein the specific area is based on a position of the first block within the captured digital image; and
process the plurality of pairs of blocks of pixels to determine an extent to which the biometric in the captured digital image corresponds to a biometric in the digital image from the database.

2. The biometric authentication system of claim 1, wherein the two-dimensional gradient filter derives the first spatial gradient by averaging horizontal difference quotients over a first sliding window, and by averaging vertical difference quotients over a second sliding window.

3. The biometric authentication system of claim 2, wherein the horizontal difference quotients have a fixed width, wherein a length of the first sliding window equals the fixed width of the horizontal difference quotients, wherein the vertical difference quotients have a fixed width, and wherein a length of the second sliding window equals the fixed width of the vertical difference quotients.

4. The biometric authentication system of claim 1, wherein the biometric comprises a skin texture.

5. The biometric authentication system of claim 1, wherein the biometric comprises a fingerprint.

6. The biometric authentication system of claim 1, wherein the biometric comprises a palm print.

7. The biometric authentication system of claim 1, wherein the biometric comprises a retinal scan.

8. The biometric authentication system of claim 1, wherein the biometric comprises an iris scan.

9. A biometric authentication system, comprising:
a database of digital images of biometrics of known people;
a camera configured to capture a digital image of a first biometric of an unknown person;
a match processor configured to identify a first planar graph of nodes within the captured digital image of the first biometric of the unknown person that corresponds to a second planar graph of nodes within a digital image of a second biometric of a known person, wherein the first planar graph of nodes and the second planar graph of nodes are based on positions of a plurality of pairs of blocks of pixels from the captured digital image and the digital image of the second biometric, wherein each pair of blocks of pixels includes a first block from a first spatial gradient of the captured digital image and a second block from a second spatial gradient of a digital image from the database; and
a match detector coupled to the match processor and configured to determine whether the first biometric of the unknown person matches the second biometric of the known person based on an extent to which edges in the second planar graph align with edges in the first planar graph.

10. The biometric authentication system of claim 9, wherein the match detector is further configured to calculate a probability that the first biometric of the unknown person does not match the second biometric of the known person based on the extent to which edges in the second planar graph align with edges in the first planar graph.

11. The biometric authentication system of claim 9, wherein the first biometric comprises a skin texture.

12. The biometric authentication system of claim 9, wherein the first biometric comprises a fingerprint.

13. The biometric authentication system of claim 9, wherein the first biometric comprises a palm print.

14. The biometric authentication system of claim 9, wherein the first biometric comprises a retinal scan.

15. The biometric authentication system of claim 9, wherein the first biometric comprises an iris scan.

16. A method comprising:
capturing, with a camera, a digital image of a first biometric of an unknown person;
identifying, with a computer operatively coupled to the camera, a first planar graph of nodes within the digital image of the first biometric of the unknown person that corresponds to a second planar graph of nodes within a digital image of a second biometric of a known person, wherein the first planar graph of nodes and the second planar graph of nodes are based on positions of a plurality of pairs of blocks of pixels from the captured digital image and the digital image of the second biometric, wherein each pair of blocks of pixels includes a first block from a first spatial gradient of the captured digital image and a second block from a second spatial gradient of a digital image from the database; and
determining whether the first biometric matches the second biometric based on an extent to which edges in the second planar graph align with edges in the first planar graph.

17. The method of claim 16, further comprising calculating a probability that the captured digital image does not match the digital image of the second biometric of the known person based on the extent to which edges in the second planar graph align with edges in the first planar graph.

18. The method of claim 16, wherein the first biometric comprises a skin texture.

19. The method of claim 16, wherein the first biometric comprises a fingerprint.

20. The method of claim 16, wherein the first biometric comprises a palm print.

21. The method of claim 16, wherein the first biometric comprises a retinal scan.

22. The method of claim 16, wherein the first biometric comprises an iris scan.

23. A method comprising:
   capturing, with a camera of a computing system, a digital image of a biometric of an unknown person;
   deriving, with a processor of the computing system, a first spatial gradient of the captured digital image;
   identifying a plurality of pairs of blocks of pixels, wherein each pair of blocks includes a first block from the first spatial gradient of the captured digital image and a second block from a second spatial gradient of a digital image stored in a database, wherein the second block is identified from within a specific area of the digital image from the database, and wherein the specific area is based on a position of the first block within the captured digital image; and
   processing the plurality of pairs of blocks of pixels to determine an extent to which the biometric in the captured digital image corresponds to a biometric in the digital image from the database.

24. A tangible computer-readable medium having computer-readable instructions stored thereon, the instructions comprising:
   instructions to capture a digital image of a biometric of an unknown person;
   instructions to derive a first spatial gradient of the captured digital image;
   instructions to identify a plurality of pairs of blocks of pixels, wherein each pair of blocks includes a first block from the first spatial gradient of the captured digital image and a second block from a second spatial gradient of a digital image stored in a database, wherein the second block is identified from within a specific area of the digital image from the database, and wherein the specific area is based on a position of the first block within the captured digital image; and
   instructions to process the plurality of pairs of blocks of pixels to determine an extent to which the biometric in the captured digital image corresponds to a biometric in the digital image from the database.

25. A tangible computer-readable medium having computer-readable instructions stored thereon, the instructions comprising:
   instructions to capture a digital image of a first biometric of an unknown person;
   instructions to identify a first planar graph of nodes within the digital image of the first biometric of the unknown person that corresponds to a second planar graph of nodes within a digital image of a second biometric of a known person, wherein the first planar graph of nodes and the second planar graph of nodes are based on positions of a plurality of pairs of blocks of pixels from the captured digital image and the digital image of the second biometric, wherein each pair of blocks of pixels includes a first block from a first spatial gradient of the captured digital image and a second block from a second spatial gradient of a digital image from the database; and
   instructions to determine whether the first biometric matches the second biometric based on an extent to which edges in the second planar graph align with edges in the first planar graph.

* * * * *